(12) United States Patent
Arendt et al.

(10) Patent No.: US 9,315,385 B2
(45) Date of Patent: *Apr. 19, 2016

(54) INCREASING THE SPECIFIC STRENGTH OF SPUN CARBON NANOTUBE FIBERS

(75) Inventors: Paul N. Arendt, Los Alamos, NM (US); Yuntian T. Zhu, Cary, NC (US); Igor O. Usov, Los Alamos, NM (US); Xiefei Zhang, Chattanooga, TN (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1474 days.

This patent is subject to a terminal disclaimer.

(21) Appl. No.: 12/002,853

(22) Filed: Dec. 17, 2007

(65) Prior Publication Data

US 2010/0284896 A1    Nov. 11, 2010

Related U.S. Application Data

(60) Provisional application No. 60/876,940, filed on Dec. 22, 2006.

(51) Int. Cl.
| | | |
|---|---|---|
| *D01F 9/12* | (2006.01) | |
| *C01B 31/02* | (2006.01) | |
| *B82Y 30/00* | (2011.01) | |
| *B82Y 40/00* | (2011.01) | |
| *D06M 10/00* | (2006.01) | |
| *D06M 101/40* | (2006.01) | |

(52) U.S. Cl.
CPC ............ *C01B 31/0233* (2013.01); *B82Y 30/00* (2013.01); *B82Y 40/00* (2013.01); *C01B 31/0253* (2013.01); *D06M 10/008* (2013.01); *C01B 2202/08* (2013.01); *D06M 2101/40* (2013.01)

(58) Field of Classification Search
USPC ........ 423/447.1–447.3, 445 B; 977/742–754, 977/842–848; 428/367
See application file for complete search history.

(56) References Cited

U.S. PATENT DOCUMENTS

| | | | |
|---|---|---|---|
| 6,682,677 B2 | 1/2004 | Lobovsky et al. | |
| 6,752,977 B2 * | 6/2004 | Smalley et al. | ............ 423/447.1 |
| 2004/0096389 A1 | 5/2004 | Lobovsky et al. | |
| 2004/0232426 A1 | 11/2004 | Graham et al. | |
| 2005/0112048 A1 | 5/2005 | Tsakalakos et al. | |
| 2005/0170089 A1 * | 8/2005 | Lashmore et al. | ......... 427/248.1 |
| 2006/0202168 A1 | 9/2006 | Barrera et al. | |
| 2006/0257565 A1 | 11/2006 | Jin et al. | |

OTHER PUBLICATIONS

Ni, et al., A Combined Computational and Experimetnal Study of Ion-Beam Modification of Carbon Nanotube Bundles, J. Phys. Chem. B 2001; 105: 12719-12725.*
Huang, et al., 99.9% purity multi-walled carbon nanotubes by vacuum high-temperature annealing, Carbon 2003; 41: 2585-2590.*
Andrews, et al., Multiwall Carbon Nanotubes: Synthesis and Application, Acc. Chem. Res. 2002; 35: 1008-1017.*
Endo, et al., Applications of carbon nanotubes in the twent-first century, Phil. Trans. R. Soc. Lond. A 2004; 362: 2223-2238.*
Definition of susceptibility, accessed online at http://www.merriam-webster.com/dictionary/susceptibility on Aug. 28, 2013.*

(Continued)

*Primary Examiner* — Daniel C McCracken
(74) *Attorney, Agent, or Firm* — Lewis Roca Rothgerber Christie LLP

(57) ABSTRACT

A spun fiber of carbon nanotubes is exposed to ion irradiation. The irradiation exposure increases the specific strength of the spun fiber.

20 Claims, 2 Drawing Sheets

(56) References Cited

OTHER PUBLICATIONS

Definition of susceptibility, accessed online at http://dictionary.reference.com/browse/susceptibility?s=t on Aug. 28, 2013.*
Definition of susceptibility, accessed online at http://oxforddictionaries.com/us/definition/american_english/susceptibility?q=susceptibility on Aug. 28, 2013.*
Definition of susceptibility, accessed online at http://dictionary.cambridge.org/us/dictionary/british/susceptibility?q=susceptibility on Aug. 28, 2013.*
Demczyk et al., "Direct Mechanical Measurement of the Tensile Strength and Elastic Modulus of Multiwalled Carbon Nanotubes," Materials Science and Engineering, A334, Sep. 2002, pp. 173-178.
Zhang et al., "Rapid Growth of Well-Aligned Carbon Nanotube Arrays," Chemical Physics Letters, vol. 362, Aug. 2002, pp. 285-290.
Dalton et al., "Super-Tough Carbon-Nanotube Fibres," Nature, vol. 423, Jun. 2003, p. 703.
Zhang et al., "Multifunctional Carbon Nanotube Yarns by Downsizing an Ancient Technology," Science, vol. 306, Nov. 2004, pp. 1358.
Li et al., "Sustained Growth of Ultralong Carbon Nanotube Arrays for Fiber Spinning," Advanced Mater., vol. 18, Nov. 2006, pp. 3160-3163.
Hong et al., "Radiation Hardness of the Electrical Properties of Carbon Nanotube Network Field Effect Transistors under High-Energy Proton Irradiation," Nanotechnology, vol. 17, Nov. 2006, pp. 5675-5680.

\* cited by examiner

INCREASING THE SPECIFIC STRENGTH OF SPUN CARBON NANOTUBE FIBERS

RELATED APPLICATIONS

This application claims the benefit of U.S. Provisional Patent Application Ser. No. 60/876,940, filed Dec. 22, 2006, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The invention generally relates to fibers of carbon nanotubes and more particularly to increasing the specific strength of spun fibers of carbon nanotubes.

BACKGROUND

Individual carbon nanotubes (CNTs) are at least one order of magnitude stronger than any other known material. CNTs with perfect atomic structures have a theoretical strength of about 300 GPa (the term strength refers to tensile strength). In practice, carbon nanotubes do not have perfect structures. However, CNTs that have been prepared have a measured strength of up to about 150 GPa, and the strength may improve upon annealing. For comparison, Kevlar fibers currently used in bullet-proof vests have a strength of about 3 GPa, and carbon fibers used for making space shuttles and other aerospace structures have strengths of about 2-5 GPa.

SUMMARY OF THE INVENTION

In accordance with the purposes of the present invention, as embodied and broadly described herein, the present invention is concerned with a method for preparing a fiber. The method includes irradiating a spun fiber that has a specific strength S1 and includes carbon nanotubes to produce an irradiated spun fiber having a specific strength S2, wherein S2>S1.

The invention is also concerned with a fiber prepared by a method that includes ion irradiating a spun fiber that has a specific strength S1 and includes carbon nanotubes to produce an irradiated spun fiber having a specific strength S2, wherein S2>S1.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
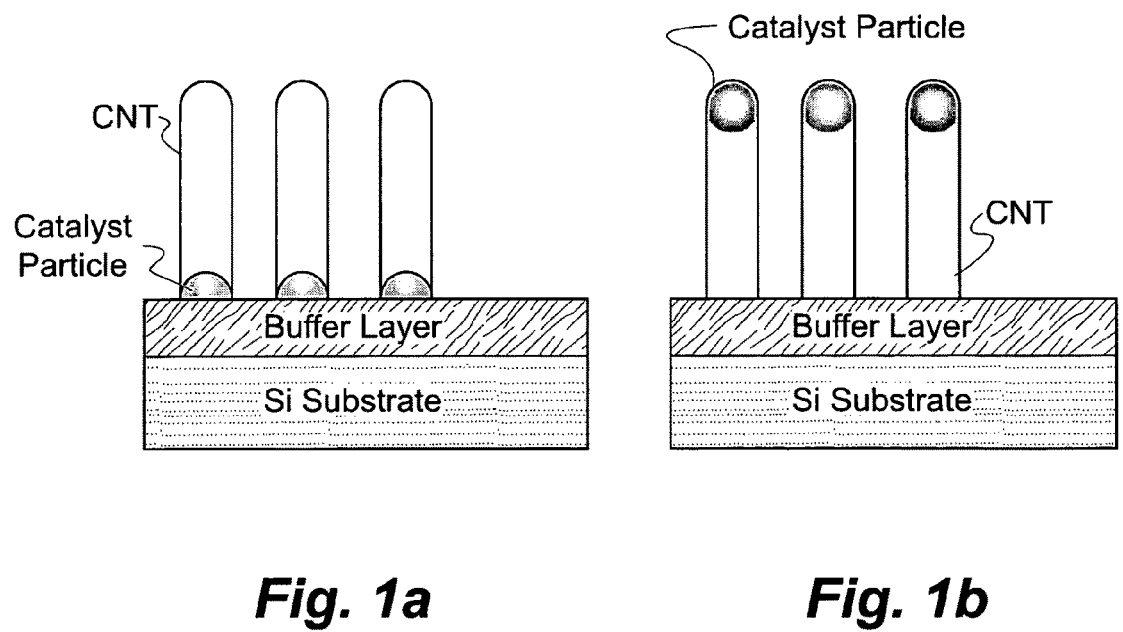
FIG. 1 shows a schematic representation of the growth of carbon nanotubes (CNTs) on a catalyst structure.

The invention is concerned with improving the specific strength (i.e. the ratio of tensile strength to density) of spun fibers that include CNTs.

Prior to having the strength increased, the spun fiber is a fiber that includes CNTs. The spun fiber may be prepared by any method useful for preparing a spun fiber of CNTs.

In some embodiments, prior to having the strength increased, a spun CNT fiber is prepared from a pile of unaligned carbon nanotubes. A fiber whose strength is increased using this invention may be prepared by any method of forming a pile of unaligned CNTs, such as by a method disclosed in U.S. patent application Ser. No. 11/438,794, incorporated by reference herein, which involves heating a catalyst species on a substrate in an atmosphere that includes a gaseous carbon source at a temperature sufficient to decompose the gaseous carbon source and form a pile of carbon nanotubes, and thereafter spinning a fiber from the pile of carbon nanotubes. After preparing the fiber, it may be irradiated using, for example, proton irradiation. After the irradiation, the resulting irradiated fiber has a specific strength that is greater than that for the pre-irradiated spun fiber.

In some embodiments, prior to having the strength increased, a spun CNT fiber may be prepared from an array of substantially aligned carbon nanotubes. Afterward, the spun fiber is irradiated. In some embodiments, the irradiation is proton irradiation. In some embodiments, the nanotubes of the array are long (having a length greater than 0.5 millimeters). An array of long nanotubes may be synthesized using a catalyst structure and a carbon-containing source under conditions where carbon from the carbon source is decomposed by the catalyst structure to form carbon nanotubes that are attached to the catalyst structure. Some embodiments of catalyst structures include a substrate, a buffer layer on the substrate, and a catalyst on the buffer layer. Arrays of this type may be prepared with a minimal amount of amorphous carbon on and/or within the array.

In some embodiments, a spun fiber prior to irradiation is prepared from an array formed on a catalyst structure that may be prepared by (i) depositing a buffer layer on a Si substrate, (ii) depositing a catalyst layer on the buffer layer, and (iii) forming catalyst particles from the catalyst layer on the buffer layer. The resulting catalyst structure is exposed to a carbon-containing precursor under conditions that result in the production of an array of long CNTs on the catalyst structure.

An embodiment catalyst structure useful for preparing a high purity, well-aligned array of multi-walled, long CNTs useful for fiber spinning and subsequent irradiation according to this invention may be prepared by depositing a layer of aluminum oxide on a silicon substrate, then depositing iron on the aluminum oxide layer, and then heat treating the resulting structure. The structure is heat treated to convert iron in the layer to iron particles of a size where each, or at least many, of the particles can initiate a carbon nanotube. An array of long CNTs is prepared by exposing the catalyst structure to a gaseous mixture of carbon source and inert gas. In some embodiments, water vapor, oxygen, hydrogen, etc. may be added to the gaseous mixture.

A non-limiting list of buffer materials for catalyst structures useful for preparing spun fibers that are subsequently irradiated includes aluminum oxide ($Al_2O_3$), magnesium oxide (MgO), zinc oxide (ZnO), silicon carbide (SiC), and silicon dioxide ($SiO_2$). A non-limiting list of catalysts useful with embodiment catalyst structures includes metals such as Fe, Co, Ni, mixtures of these metals, and alloys of these metals such as, but not limited to, Co—Mo alloy or Fe—Mo alloy.

In some embodiments, a layer of aluminum oxide ($Al_2O_3$) of a thickness of from about 2 nanometers (nm) to about 200 nm, is deposited on the silicon dioxide by ion beam assisted deposition (IBAD). In an embodiment, a layer of aluminum oxide of a thickness of about 10 nm is deposited on the substrate by IBAD. In other embodiments, the layer of aluminum oxide may be prepared by a different technique such as electron beam evaporation, chemical vapor deposition (CVD), or the like. The IBAD technique can deposit an $Al_2O_3$ layer that is fully, or at least partially amorphous. After the IBAD deposition, a thin layer (of about 1-3 nm in thickness) of iron is magnetron sputter-deposited onto the aluminum oxide layer. The aluminum oxide layer may in some way improve catalytic activity and extend the lifetime of the catalyst.

Some factors that may have an affect on the formation of catalyst particles include (i) the composition and thickness of the buffer layer, (ii) the composition and thickness of the catalyst layer, and (iii) the temperature at which the catalyst is heated to form catalyst particles from the layer. With regard to the thickness of the catalyst layer, a thicker layer tends to result in a structure with larger catalyst particles. Catalyst particles are less likely to form using a catalyst structure having too thin a catalyst layer.

The temperature used for converting a catalyst layer into catalyst particles is typically the same or higher than the temperature used for nanotube production. The catalyst particles that form after a heating procedure should be stable during the nanotube growth. The temperature for nanotube growth is largely determined by the carbon source and catalyst composition and size. These parameters tend to be interdependent. Sometimes, water is included in the gaseous mixture by passing a small amount of Ar gas through a water bubbler. The addition of water vapor can also participate in minimizing the formation of amorphous carbon on the CNT array.

The size of the catalyst particles may have an affect on the diameters of individual carbon nanotubes. In some embodiments, catalyst particles with diameters in the range of about 1 nanometer to about 30 nanometers are uniformly distributed on a substrate. A catalyst particle density is chosen that results in a nanotube array rather than randomly oriented nanotubes.

The invention may employ a wide range of carbon sources, usually gases but sometimes liquids. Alkanes hydrocarbons such as alkanes (hexane, methane and ethane, for example), alkenes (ethylene, for example), alkynes (acetylene, for example) and other gaseous sources may be used. Other carbon sources including, but not limited to, functionalized hydrocarbons (alcohols and ketones (acetone, ethanol, and the like) may be used. Also, a wide range of concentrations (from about 1 percent to about 100 percent of the carbon source and from about 1 percent to about 100 percent of an inert gas such as argon, helium, or an inert gas mixture) may be used. Hydrocarbons may also include functional groups such as hydroxyl groups (ethanol, for example) and ketone groups (acetone, for example). When ethanol is used as a carbon source gas, the processing temperature is in the range of from about 750 degrees Celsius to about 1000 degrees Celsius.

Figure 2:
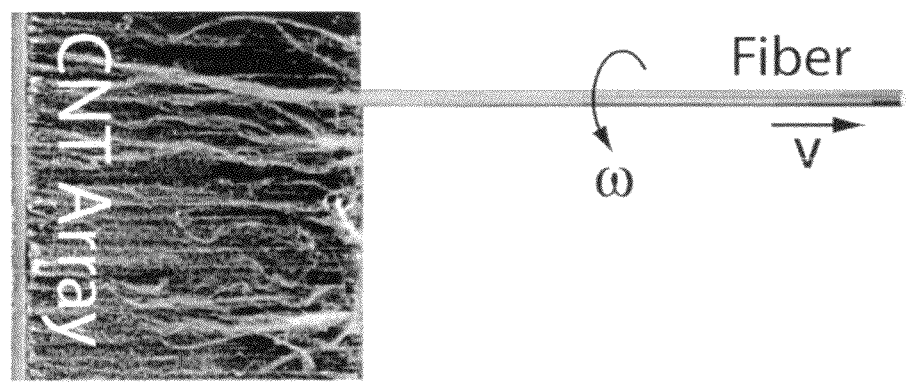
FIG. 2 shows a schematic representation of spinning a fiber from an array of CNTs.

FIG. 2 shows a schematic diagram relating to spinning a fiber from an array of long CNTs. As FIG. 2 shows, the fiber spins at a rate of ω while being pulled at a speed of v. The spinning parameters ω and v likely have an effect on the microstructural characteristics (e.g. the fiber diameter, the helix angle of individual CNTs in the fiber, and the like) of the resulting CNT fiber. The spinning parameters can be adjusted to optimize the fiber structure for highest strength.

A spinning shaft with an end configured for nanotubes to stick on (a hooked end, an end with adhesive, and the like) may be used for preparing a fiber from the CNT array. When this end of the spinning shaft makes contact with nanotubes from the supported array, the nanotubes begin to twist around the shaft. Many thousands of nanotubes are likely twisted together at the beginning. A fiber begins to grow as the array moves relative to the spinning shaft, and additional nanotubes from the array can twist around the growing fiber to extend the length of the fiber.

An as-spun fiber can be stretched to improve alignment of the nanotubes prior to irradiation.

In some embodiments, fibers prepared from arrays of CNTs are irradiated with protons. TABLE 1 summarizes data obtained by preparing an array of CNTs, spinning a fiber from the array, and irradiating the spun fiber using a 100 keV proton beam with a proton dose of $2 \times 10^{16}$ protons/cm$^2$. Two different array lengths were used and also two different twist speeds were used. In some cases, the fiber diameter shrunk slightly as a result of the irradiation. The increase in the specific strength of a fiber, as a result of the proton irradiation is also listed.

TABLE 1

| CNT array length (millimeters) | Spinning rate (ω) in Hertz | Fiber diameter before irradiation (micrometers) | Fiber diameter after irradiation (micrometers) | Specific Strength increase |
|---|---|---|---|---|
| 0.3 mm | 3-5 Hz | 3.3 μm | 3.0 μm | 90% |
| 0.3 mm | 20-50 Hz | 3.0 μm | 2.7 μm | 45% |
| 0.5 mm | 3-5 Hz | 5.6 μm | 5.6 μm | 39% |
| 0.5 mm | 20-50 Hz | 5.4 μm | 5.4 μm | 43% |

The catalyst structure used for synthesizing the CNT arrays that were used for preparing irradiated fibers of TABLE 1 included a silicon support having a thin surface layer of silicon dioxide ($SiO_2$). They were prepared by depositing a thin layer of aluminum oxide ($Al_2O_3$) of about 10 nm on the silicon dioxide by ion beam assisted deposition (IBAD). Other techniques such as electron beam evaporation could also have been used. After the IBAD deposition, a layer of about 0.8-3 nm in thickness of iron was magnetron sputter deposited onto the aluminum oxide layer. The resulting catalyst structure was placed into a quartz tube furnace. The furnace was heated to 750 degrees Centigrade and a gaseous mixture of argon, hydrogen (about 6 percent) and ethylene was sent through the tube furnace. Water vapor could have been included in the gaseous mixture by passing a small amount of Ar gas through a water bubbler. After the array was formed, it was spun into a fiber. The CNT fiber was spun using a hand-held spindle, which twists a number of CNT fibers after they have been pulled away from the array at speed v. As FIG. 2 shows, the fiber spins at a rate of ω while being pulled at a speed of v. The spinning parameters ω and v likely have an effect on the microstructural characteristics (e.g. the fiber diameter, the helix angle of individual CNTs in the fiber, and the like) of the resulting CNT fiber. The spun fiber then cut in half. The tensile strength of one of the halves was then measured. The other half was then wound on a graphite rod, and the rod was then mounted in a VARIAN DF-3000 ion implanter. The rod was rotated with a speed of about 1 turn per 10 seconds and the wound fiber was irradiated at ambient temperature and using protons ($H^+$) accelerated to an energy of 100 kilo-electron volts (keV). The total proton irradiation dose was $2 \times 10^{16}$ protons/cm$^2$. The irradiation time was 400 seconds.

The mechanical properties of both halves were characterized by a RHEOMETRICS RSAIII solids analyzer and a SHIMADZU universal tester with a 5N load cell. The CNT fiber with a gauge length 5 mm were mounted on a paper tab, which was cut after the paper tab with fiber was mounted on the testing machine and before the testing started. The fiber diameter was measured using a laser diffraction and interference method. The displacement rate for tensile testing was 0.05 mm/s.

CNT fiber irradiation was performed with protons ($H^+$) because they are light ions that provide deep penetration at moderate energies (less than 200 keV, which for commercially available ion implanters is a standard energy). Other non-limiting examples of light ions such as $H_2^+$, $H_3^+$, helium ions, or carbon ions could also be used.

Without wishing to be bound by any particular explanation, it is believed that irradiation of CNT fibers results in the production of defects in individual CNTs. These defects are believed to include dangling bonds that result in crosslinking between adjacent CNTs. This crosslinking prevents CNTs from sliding along each other and improves mechanical strength of the irradiated fiber. Defects that do not result in crosslinking deteriorate mechanical properties of individual CNTs. Large concentrations of such defects may have a negative impact on mechanical properties of fibers. The removal of such defects may be accomplished by, for example, post irradiation annealing or irradiation at elevated temperature. A temperature range suitable for heating while irradiating spun fibers according to embodiments of the invention is from about 300 to 700 degrees Centigrade. Fibers may be heated using, for example, resistive heating by passing current through the fiber, heating using lamps, mounting the fiber on a reel and heating it on the reel, and the like.

A spinning approach provides a fiber with a helical orientation of nanotubes that results from spinning the nanotubes and twisting them around each other. A helical orientation contributes to improving load transfer because the twisted nanotubes can squeeze radially against each other when the composite fiber is under load, which increases the bonding strength and consequently load-transfer efficiency. Irradiation of the spun fiber further increases the bonding strength and the load-transfer efficiency by providing crosslinks between individual CNTs of the fiber.

The nanotubes of the array may be coated with a polymer solution before they are spun into fibers. CNT fibers spun from the array can also be infiltrated/coated with a polymer matrix to form composite fibers. Some non-limiting examples of polymer solutions include polystyrene dissolved in toluene, low viscosity liquid epoxy, polymethylmethacrylate (PMMA) dissolved in PMF, polyvinyl alcohol (PVA) in water, and poly(vinyl pyrrolidone) (PVP) in water. After infiltration/coating, the resulting fiber composite may be irradiated. Irradiation may improve bonding between the polymer and the individual CNTs. As a result the fiber may be stronger.

For polymer-coated nanotubes, after spinning and stretching, solvent is evaporated and the polymer is cured at an appropriate temperature, and then the product is irradiated. Detailed treatment parameters may depend on the specific polymer and solvent that are used during the preparation. A vacuum oven may be used for solvent removal and curing.

Irradiation of spun fibers is believed to improve their electrical conductivity. The increased conductivity is believed to result from additional paths for electrical current flow as a result of the crosslinking. In addition, irradiation may result in a reduction of the band gap of semiconducting CNTs. With a smaller band gap, more carriers would be present at a given temperature, which would lower the resistivity and increase the conductivity.

Irradiated CNT spun fibers may be used for a variety of applications. These fibers could be used to prepare superior laminates, woven textiles, and other structural fiber composite articles. They could be used to prepare strong and light armor for aircraft, missiles, space stations, space shuttles, and other high strength articles. The reduced weight would allow aircraft, spacecraft, and projectiles to fly faster and for longer distances while using less fuel.

In summary, spun fibers of carbon nanotubes were irradiated. The irradiation conditions used resulted in an increase in the specific strength of the spun fibers. The irradiation is believed to result in crosslinks between carbon nanotubes of a fiber.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing a fiber, comprising:
    irradiating a spun fiber having a specific strength S1 and comprising carbon nanotubes to produce an irradiated spun fiber having a specific strength S2, wherein S2>S1; and
    heating the irradiated spun fiber at about 300 degrees C. to about 700 degrees C.

2. The method of claim 1, wherein irradiating the spun fiber comprises irradiating with protons.

3. The method of claim 1, further comprising preparing a spun fiber from an array of carbon nanotubes.

4. The method of claim 3, further comprising preparing an array of carbon nanotubes by heating a catalyst structure in the presence of a carbon-containing precursor.

5. The method of claim 4, wherein the catalyst structure comprises a substrate portion having a first side and a second side, a buffer layer on the first side of the substrate, and a catalyst on the buffer layer.

6. The method of claim 5, wherein the substrate comprises silicon, glass, metal, or combinations thereof.

7. The method of claim 5, wherein the buffer layer comprises aluminum oxide, magnesium oxide, zinc oxide, silicon carbide, or combinations thereof.

8. The method of claim 5, wherein the catalyst comprises metal particles chosen from iron, cobalt, nickel, molybdenum, mixtures thereof, or alloys thereof.

9. The method of claim 4, wherein the carbon-containing precursor is chosen from hydrocarbons, alcohols, ketones, or mixtures thereof.

10. A fiber prepared by a method that comprises:
    irradiating a spun fiber having a specific strength S1 and comprising carbon nanotubes to produce an irradiated spun fiber having a specific strength S2, wherein S2>S1; and
    heating the irradiated spun fiber to about 300 degrees C. to about 700 degrees C. so as to reduce the number of structural defects within the carbon nanotubes of the irradiated spun fiber relative to the number of structural defects within the carbon nanotubes of the irradiated spun fiber before heating.

11. The fiber of claim 10, wherein irradiating the spun fiber comprises irradiating with protons.

12. The fiber of claim 10, further comprising preparing a spun fiber from an array of carbon nanotubes.

13. The fiber of claim 12, further comprising preparing an array of carbon nanotubes by heating a catalyst structure in the presence of a carbon-containing precursor.

14. The fiber of claim 13, wherein the catalyst structure comprises a substrate portion having a first side and a second side, a buffer layer on the first side of the substrate, and a catalyst on the buffer layer.

15. The fiber of claim 14, wherein the substrate comprises silicon, glass, metal, or combinations thereof.

16. The fiber of claim 14, wherein the buffer layer comprises aluminum oxide, magnesium oxide, zinc oxide, silicon carbide, or combinations thereof.

17. The fiber of claim 14, wherein the catalyst comprises metal particles chosen from iron, cobalt, nickel, molybdenum, mixtures thereof, or alloys thereof.

18. The fiber of claim 13, wherein the carbon-containing precursor is chosen from hydrocarbons, alcohols, ketones, or mixtures thereof.

19. The method of claim 1, wherein the carbon nanotubes are coated with polymer.

20. The fiber of claim 10, wherein the carbon nanotubes are coated with polymer.

* * * * *